United States Patent [19]

Vignoito

[11] Patent Number: 5,149,207
[45] Date of Patent: Sep. 22, 1992

[54] SEAL FOR BEARINGS OF MOTOR VEHICLE WHEEL HUBS

[75] Inventor: Angelo Vignoito, Turin, Italy
[73] Assignee: SKF Industrie S.p.A., Turin, Italy
[21] Appl. No.: 698,938
[22] Filed: May 13, 1991
[30] Foreign Application Priority Data May 24, 1990 [IT] Italy ............... 67380 A/90

[51] Int. Cl.⁵ ............... F16C 33/76; F16C 33/78; F16J 15/32
[52] U.S. Cl. ............... 384/478; 277/25; 277/37; 277/68; 277/152; 384/485; 384/486
[58] Field of Search ............... 277/37, 50, 152, 153, 277/25, 68; 384/486, 485, 484, 589, 544, 478

[56] References Cited

U.S. PATENT DOCUMENTS

| | | | |
|---|---|---|---|
| 2,916,335 | 12/1959 | Cogger | 384/544 X |
| 3,363,911 | 1/1968 | McKinven, Jr. | 277/153 X |
| 3,519,316 | 7/1970 | Gothberg | 384/486 |
| 3,806,214 | 4/1974 | Keiser | 384/589 |
| 3,838,898 | 10/1974 | Bird . | |
| 4,208,057 | 6/1980 | Messenger | 277/37 |
| 4,252,329 | 2/1981 | Messenger | 277/153 X |
| 4,285,526 | 8/1981 | Klinteberg et al. | 277/153 |
| 4,643,436 | 2/1987 | Jackowski | 277/50 X |
| 4,770,425 | 9/1988 | Colanzi et al. | 277/153 |
| 4,792,243 | 12/1988 | Takeuchi et al. | 384/486 |

FOREIGN PATENT DOCUMENTS

| | | | |
|---|---|---|---|
| 458213 | 7/1949 | Canada | 277/153 |
| 51170 | 5/1982 | European Pat. Off. | 384/486 |
| 65887 | 12/1982 | European Pat. Off. | 384/486 |
| 1959724 | 6/1971 | Fed. Rep. of Germany | 384/484 |
| 3616999 | 11/1987 | Fed. Rep. of Germany | 384/484 |
| 3838824 | 5/1990 | Fed. Rep. of Germany . | |
| 2570146 | 11/1986 | France . | |
| 42212 | 2/1990 | Japan | 384/484 |
| 625604 | 6/1949 | United Kingdom | 277/153 |
| 2213210 | 8/1989 | United Kingdom . | |

Primary Examiner—Allan N. Shoap
Attorney, Agent, or Firm—Bachman & LaPointe

[57] ABSTRACT

A seal device for wheel hub bearings consists of a centrifugation device (1) equipped with a seal (3) and a screen or shield (2) mounted onto the outer fixed race (11). The centrifugation device (1) is fixed to the inner rotating race (10) of the bearing. The seal (3) is provided with lips (7,8) which slide respectively against the outer race (11) of the bearing and against the shield (2) mounted on this race. The centrifugation device (1) and the shield (2) are shaped and positioned between the two races so as to form a first chamber (21) open towards the outside of the bearing, a second closed intermediate chamber (22) and a third chamber (23) open towards the inner parts of the bearing.

4 Claims, 1 Drawing Sheet

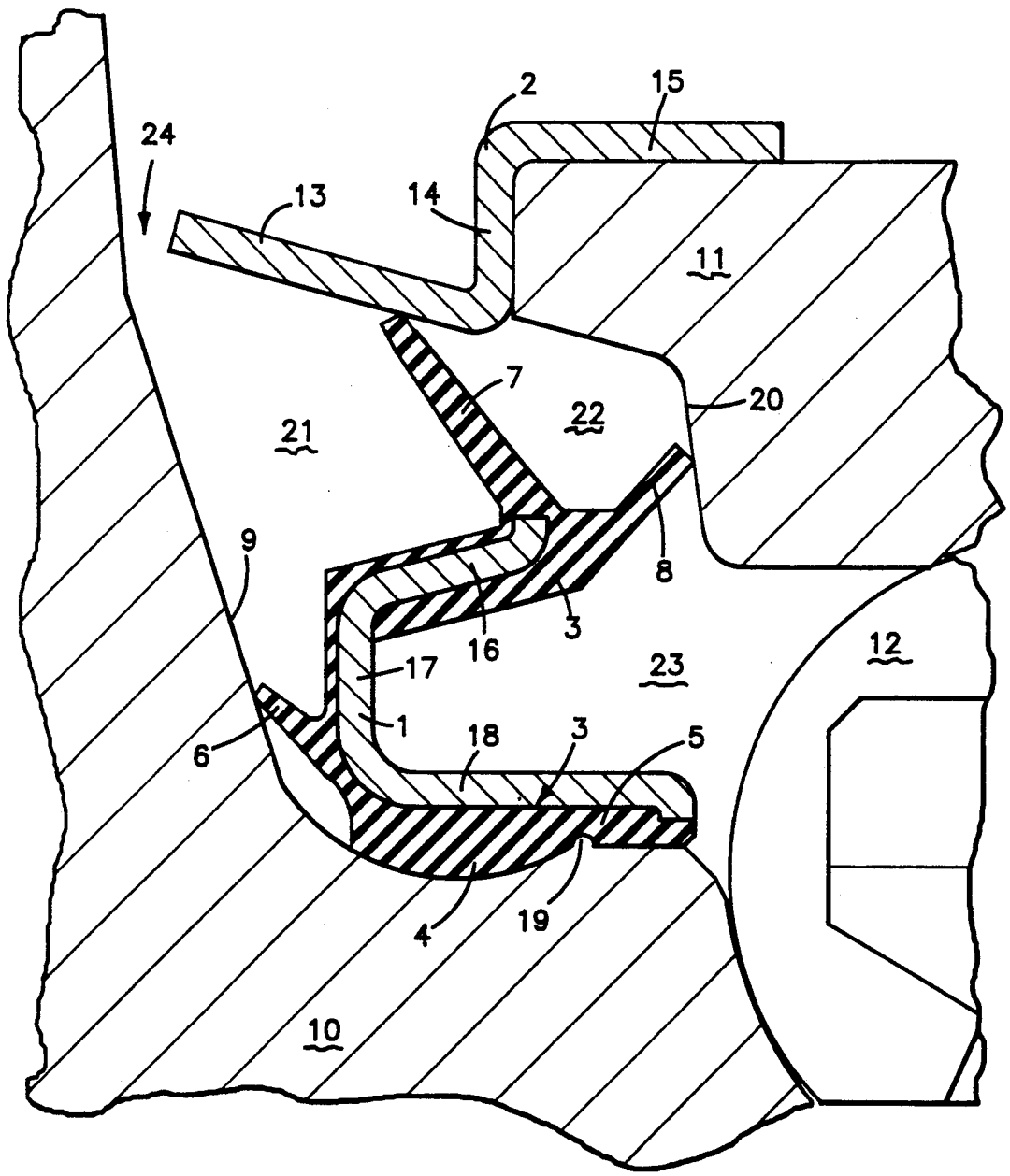

SEAL FOR BEARINGS OF MOTOR VEHICLE WHEEL HUBS

BACKGROUND OF THE INVENTION

The present invention is referred to a sealing device for vehicle wheel hub bearings.

Recent generations of bearings, that are assembled on wheel hubs, allow very good operating performance, but are quite expensive. As a consequence, they need to be provided with seals that guarantee a seal as safe as possible against the infiltration of external polluting agents such as water, and dust, mud to which the members on which the bearings are mounted are constantly subjected.

At the moment these seals, although they have two sealing lips, are designed in such a way that the lips wear out very quickly and/or do not ensure satisfactory operating conditions at the inside of the bearing. The latter condition occurs because the lips are not always oriented correctly and are not pushing on the surface of the member on which they have to carry out the sealing action.

The rubber lips slide on a rotating counterface and their sealing action becomes less effective with time.

After a working phase, a depression due to cooling takes place, and after a long time corrosion phenomena may occur on the rotating counterface, in the exact zone that is engaged by the sealing lips.

SUMMARY OF THE INVENTION

It is an object of the invention to overcome the aforesaid drawbacks by disclosing a device that:
improves the seal both of the static type on the bearing's outer race and of the dynamic type (on the inner races);
reduces the noxious effect that is due to the thermic variations which the parts that are in contact are subject to; and
causes a much longer seal life and consequently of the bearing itself, even in very hard working conditions.

These and other objects that will appear more clearly ater reading the following detailed description. This invention proposes to realize a sealing device for motor vehicle wheel hubs characterized by a centrifugation device (1) equipped with a seal (3) mounted on the inner rotating race (10) of the bearing and a screen or shield (2) mounted on the outer fixed race (11). The seal (3) is provided with sealing lips (7, 8) which slide respectively against the outer race (11) of the bearing and against the shield (2) mounted onto such race. The centrifugating device (1) and the shield (2) being are shaped and positioned so as to form a first chamber (21) open towards the outside of the bearing, a second closed intermediate chamber (22) and a third chamber (23) open towards the inner parts of the bearing.

BRIEF DESCRIPTION OF THE DRAWINGS

The device according to this invention is now going to be described with reference to the enclosed drawing, that is a cross-section of the device mounted on a bearing.

DETAILED DESCRIPTION

A vehicle wheel hub bearing compress an inner rotating race 10, an outer fixed race 11 and two sets of balls 12 forming a ring and kept in position by special cages that are interposed between such races.

Members 10, 11 and 12 of the rolling-contact bearing will not be described in details as they are not the object of this invention. They are shown in the drawing with exemplifying shapes sizes as they can follow any further configuration in accordance with the different uses, without modifying the objects and the benefits of the device that is the object of the present invention.

A centrifugation device 1, made of rigid material is bonded to the inner rotating race 10 by means of a rubber seal 3.

The seal 3 comprises a lower main body 4, a cylindrical portion 5 that stretches towards the balls 12, and a sealing lip 6 that reaches the wall 9. This wall has a toroidal shape so as to exploit the centrifugal action of the inner resolving race 10 sending away the polluting agents from the inside of the bearing.

A small groove 19 is provided nearby the junction of the cylindrical portion 5 to the central body 4, so as to make the two zones of the compressed rubber independent.

The centrifugation device 1 is formed by the union of three surfaces: a cylindrical surface 18 disposed axially, a flat surface 17 disposed radially and a tapered surface 16 diverging in the direction of the outer race 11.

The seal 3 is wrapped externally around the flat surface 17 of the centrifugation device 1 and covers by completely its tapered portion 16.

Referring to the drawing, the seal 3 is further provided with two sealing lips. A main lip 7 stretches towards the outside of the bearing reaching the counterface 13 of a shield 2 that is force fitted on a special surface of the outer fixed race 11. A secondary lip 8 stretches towards the inside of the bearing, touching a radially disposed plane surface 20 of the outer race 11.

Shield 2 is made of anti-corrosive material (such as stainless steel). It is formed by the union of three circular surfaces: an axially disposed cylindrical surface 15, a flat radial surface 14 and a tapered overhanging surface 13 diverging towards the outside of the bearing.

Surfaces 14 and 15 are pressed against the outer race 11. The shield 2 and the seal 3 are reciprocally positioned so as to form three separate chambers. A first chamber 21 is open towards the outside of the bearing; a second intermediate chamber 22 is closed by lips 7 and 8, by counterface 13 and by the outer race 11; and a third chamber 23 is the most internal one and the one where it is intended to prevent the infiltration of external polluting agents.

The only possible way for polluting elements to enter is the opening 24. The tapered portion 13 of the shield 2 is meant to act as a dust-cover. It stretches towards the toroidal surface 9 in such a way that it tightens the entrance for the polluting agents and subsequently facilitates the expulsion thereof due to the centrifugal effect.

During operation, the centrifugation device 1 and the seal 3 rotate together with the inner race 10.

The centrifugal force that is generated expels eventual polluting agents out of chamber 21, and presses the main lip 7 against counterface 13, increasing the contact force and guaranteeing the sealing action.

The secondary lip 8 slides on the surface 20 of the outer race 11 preventing polluting agents, that may have passed lip 7 into chamber 22, from reaching chamber 23.

The sealing lip 6 is designed to ensure a further sealing action so as to prevent polluting agents from getting near the central body 4 of seal 3.

Intermediate chamber 22 is filled with grease that lubricates sealing lips 7 and 8. Moreover, in operation the centrifugation device 1 is heat insulated by means of seal 3 from the high temperatures generated by the brake disks, overcoming in this way the above-mentioned drawbacks.

The device according to this invention has the further advantage that it needs no springs to ensure the sealing contact between the seal 3 and the race 10 of the bearing.

I claim:

1. A sealing device for motor vehicle hubs having a bearing with an inner rotating race and an outer fixed race comprising a centrifugation device (1) equipped with a seal (3) mounted on the inner rotating race (10) of the bearing and a shield (2) mounted on the outer fixed race (11); said shield being composed by the union of three circular surfaces, said circular surfaces including an axially disposed cylindrical surface, a radially disposed plane surface, and a tapered surface diverging towards the outside of the bearing, said tapered surface acting as a dust cover and stretching towards the surface of the inner race in such a way as to tighten an opening for polluting agents and as to subsequently facilitate expulsion of polluting agents by centrifugal effect; the seal (3) being bound to the centrifugation device (1) and being fixed to the inner race (10) by a lower main body portion (4) and a cylindrical portion (5); said seal (3) having three sealing lips (6, 7, 8), a first (6) of said sealing lips sliding respectively against a surface (9) of the inner race (10) so as to prevent polluting agents from getting near the lower main body portion, a second (7) of said sealing lips sliding against and contacting the shield (2) mounted onto the outer race (11), and a third (8) of said sealing lips contacting and sliding against a surface (20) of the outer race (11), said second of said sealing lips being located intermediate said first of said sealing lips and said third of said sealing lips and being distant from said lower main body portion and said cylindrical portion of said seal, and said third of said sealing lips being distant from said lower main body portion (4) and said cylindrical portion (5); said sealing lips increasing the sealing action caused by centrifugal action by increasing the contact force against the portion of the shield; and the centrifugation device (1) and the shield (2) being shaped and positioned so as to form a first chamber (21) open towards an exterior portion of the bearing, said first chamber being located between said first of said sealing lips and said second of said sealing lips, a second closed intermediate chamber (22) between said second of said sealing lips and said third of said sealing lips and a third chamber (23) open towards inner parts of the bearing and being located between said third of said sealing lips and said lower main body and said cylindrical portions of said seal.

2. A sealing device according to claim 1 wherein the centrifugation device is formed by the union of three circular surfaces; said three circular surfaces including an axially disposed cylindrical surface, a flat radially disposed surface and a tapered surface diverging towards the outer race.

3. A sealing device according to claim 2 wherein said seal is wrapped around the flat surface of said centrifugation device and completely covers the tapered surface of said centrifugation device.

4. A sealing device according to claim 1 wherein the seal (3) is made from rubber and has a groove (19) at the junction of said lower main body portion (4) and said cylindrical portion (5).

* * * * *